3,320,079
ETHER-ACID POLYESTER COMPOSITION
Milton A. Perry and Frank C. Canter, Longview, Tex., assignors to Eastman Kodak Company, Rochester, N.Y., a corporation of New Jersey
No Drawing. Original application July 11, 1960, Ser. No. 41,722. Divided and this application Oct. 22, 1962, Ser. No. 240,189
7 Claims. (Cl. 106—181)

This application is a division of application Serial No. 41,722, filed July 11, 1960, now abandoned.

This invention relates to a novel α,α-disubstituted dicarboxylic ether acid and linear polyesters prepared therefrom. More particularly, it relates to plasticizers prepared from a novel α,α-disubstituted dicarboxylic ether acid and resin compositions based thereon. By resin compositions we mean compositions containing as the primary ingredient thereof a natural or synthetic resin or amorphous, organic, semi-solid or solid material produced by polymerization of one or more monomeric compounds.

It is known that various low-molecular weight polyesters derived from diols condensed with bifunctional dicarboxylic acids are useful as plasticizers. Such plasticizers, however, are often characterized by poor hydrolytic stability, especially when they contain ether oxygen atoms. That is, they possess little resistance to hydrolysis, particularly when incorporated in such resinous compositions as cellulose derivatives and vinyl polymers.

It is accordingly an object of this invention to provide a novel ether acid useful in the preparation of plasticizers of improved hydrolytic stability.

It is a further object of this invention to provide highly-stabilized plasticizers which are outstanding in their resistance to hydrolysis and have other advantageous properties which were unexpected.

It is a still further object of this invention to provide novel polyester compositions prepared by reacting a novel dicarboxylic ether-acid with a diol.

It is still another object of this invention to provide resin compositions which remain stable against hydrolysis by the incorporation therein of a polyester prepared by the reaction of a novel ether-acid with an appropriate diol.

These and other objects of the invention will be apparent from the description and claims that follow.

An embodiment of the present invention consists of providing the novel ether acid 3,3'-oxybis(2,2-dimethylpropionic acid) of the formula:

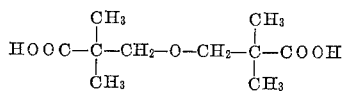

and its use in the preparation of a polyester plasticizer and stabilized resin compositions containing said polyester plasticizer. The ether acid is characterized by having a neopentyl carbon atom in the α-position. In other words, it is an α,α-disubstituted dicarboxylic ether acid, both carbon atoms adjacent to the carboxyl groups or beta to the ether linkage being disubstituted with methyl radicals and neither having a hydrogen atom bonded directly thereto.

One method of preparing the novel ether acid is by reacting ethyl bromopivalate and the sodium salt of the hydroxy-pivalate ester. According to this method metallic sodium is added to a solution of ethyl hydroxypivalate in benzene until the evolution of hydrogen ceases, the reaction is then brought to reflux, ethyl bromopivalate is added, refluxing is continued, and the bromide precipitated. The resulting mixture is then cooled and filtered, and the benzene removed by evaporation. Next, aqueous alcoholic sodium hydroxide is added to accomplish saponification, and ethanol is removed by evaporation. The aqueous solution of the resultant salts is then acidified to yield the 3,3'-oxybis(2,2-dimethylpropionic acid). An alternate method of preparation involves the oxidation of 3,3'-oxybis(2,2-dimethylpropanol-1) with nitric acid.

According to one embodiment of the invention a polyester plasticizer can be advantageously made by ester interchange between the 3,3'-oxybis(2,2-dimethylpropionic acid) with 1,4-cyclohexanedimethanol in accordance with known procedures, such as these disclosed in U.S. Patent No. 2,901,466. One or more of the known ester interchange catalysts useful in the preparation of prior art polyesters can be employed, e.g., sodium butoxide, titanium tetraoxide, dibutyl tin oxide, etc. The ester interchange reaction is continued until the polymer formed thereby has an intrinsic viscosity of from about 0.35 to about 0.55, and is in the form of a viscous liquid or waxy solid. The 1,4-cyclohexanedimethanol employed can be used in the form of either its cis or trans isomer or a mixture thereof. The polyester is incorporated in resin compositions such as polyvinyl resins and cellulose derivatives by standard mixing procedures. Typical polyvinyl resins within which the polyester of 3,3'-oxybis(2,2-dimethylpropionic acid) and 1,4-cyclohexanedimethanol can be incoroprated as a plasticizer are polymers of styrene, vinyl chloride, vinyl acetate, vinyl carbazole, vinylidene chloride, esters of acrylic acid such as methyl acrylate, esters of methacrylic acid such as methyl methacrylate, etc. and mixtures of thereof. Cellulose derivatives in which this polyester may be used effectively as a plasticizer include cellulose nitrate and cellulose organic acid esters such, for example, as cellulose acetate, cellulose acetate-propionate, cellulose acetate-butyrate, etc.

The poymeric plasticizers of this invention are of particular value for the manufacture of plasticized polyvinyl chloride sheets such as are used for shower curtains, raincoats, and in wading pools and swimming pools. It is well known that ordinary plasticizers tend to leach out of thin sheets during prolonged contact with water. In contrast to this, it has been found that the polymeric plasticizers of the present invention show excellent permanence under these conditions. Resistance to hydrolysis is also of great importance. Many of the previously known polymeric plasticizers made from aliphatic acids such as adipic, succinic, or sebacic, are hydrolyzed in a relatively short time when exposed to water. The plasticizers made from aromatic acids known in the art are only slightly better in this regard. The polymeric plasticizers made by reacting the usual aliphatic and aromatic acids with diethylene glycol or triethylene glycol are especially unstable toward hydrolysis.

Hence, it was very surprising to discover that the polymeric plasticizers made from 3,3'-oxybis(2,2-dimethylpropionic acid) and 1,4-cyclohexanedimethanol are, for all practical purposes, almost completely resistant to hydrolysis under normal conditions of use.

These polymeric plasticizers are of particular value as plasticizers for polyvinyl chloride resins prepared from copolymers of vinyl chloride with vinyl acetate, acrylonitriles, vinylidene chloride, isopropenyl acetate, and the like. They are also useful in cellulose acetate, cellulose triacetate, cellulose propionate, cellulose propionate-butyrate, cellulose butyrate, and the like.

The polyester plasticizers prepared from 3,3'-oxybis(2,2-dimethylpropionic acid) and 1,4-cyclohexanedimethanol can also be used in combination with other plasticizers. They can be incorporated with the resin compositions to be plasticized by the usual rolling and milling methods. They can also be added to solutions or dopes prior to extrustion or casting.

The preparation of the 3,3'-oxybis(2,2-dimethylpropionic acid) and its use in the production of the polyester plasticizers, including the incorporation of these polyesters in resin compositions, are illustrated by the following examples. It is not intended that the invention should be limited to the specific compositions set forth in these examples which are provided for purposes of illustration.

EXAMPLE 1

*Preparation of 3,3'-oxybis(2,2-dimethylpropionic acid)*

One mole of ethyl hydroxypivalate was dissolved in 500 cc. of benzene, and one mole of clean metallic sodium chips was added slowly until no more hydrogen was evolved. The reaction was then brought to reflux, and one mole of ethylbromopivalate was added slowly. The mixture was refluxed for 2 hours and a heavy precipitate of sodium bromide formed. The mixture was cooled, filtered, and the benzene removed by evaporation. Saponification was accomplished with aqueous alcoholic sodium hydroxide and the resulting mixture evaporated to remove ethanol. Acidification of an aqueous solution of the resultant salts gave a 51% yield of 3,3'-oxybis(2,2-dimethylpropionic acid), having a melting point of 154°–155° and a neutral equivalent of 109.

EXAMPLE 2

*Preparation of 3,3'-oxybis(2,2-dimethylpropionic acid)*

Five grams of 3,3'-oxybis(2,2-dimethylpropanol-1) were oxidized with 75 cc. of 70% nitric acid (commercial). The resultant mixture was cooled until crystals were deposited. The precipitate was separated by filtration and then recrystallized from benzene. A 64% yield of 3,3'-oxybis(2,2-dimethylpropionic acid) was obtained.

EXAMPLE 3

*Preparation of polyester from 3,3'-oxybis(2,2-dimethylpropionic acid) and 1,4-cyclohexanedimethanol.*

A stirred reaction vessel equipped to allow blanketing with an inert atmosphere and to also allow applying reduced pressure to the vessel was charged with the following materials:

10.9 g. (0.05 mole) 3,3'-oxybis(2,2-dimethylpropionic acid)
11.5 g. (0.08 mole) 1,4-cyclohexanedimethanol (60–65% transisomer)
0.02 g. titanium tetrabutoxide
0.01 g. dibutyl tin oxide The mixture was heated with stirring in a nitrogen atmosphere first at 200° C. for 30 minutes, than at 230° C. for 30 minutes and finally at 240° C. for an hour. The temperature was then raised to 275° C., and vaccum was applied to the system. The resulting polymer melt was heated under 0.5 mm. Hg. pressure first at 275° C. for three hours and then at 290° C. for two hours. At this point, the melt was highly viscous and light amber in color. On cooling, the polymer formed was slightly tacky. It had an inherent viscosity of 0.46 when measured in 60 parts of phenol and 40 parts tetrachloroethane.

For purposes of comparison the following example is provided:

EXAMPLE 4

*Preparation of a polyester of 3,3'-oxybispropionic acid and 1,4-cyclohexanedimethanol*

In accordance with the procedure of Example 3, a polyester was prepared from 3,3'-oxybispropionic acid. At 260° the reaction had to be stopped after five minutes because the acid began to cleave to an acrylate ester with cross linking. What little polymer could be isolated had an intrinsic viscosity of 0.27.

EXAMPLE 5

*Comparison of properties of polyester of 3,3'-oxybis-(2,2-dimethylpropionic acid) with 3,3'-oxybispropionic acid*

A comparison was made of the thermal and hydrolytic stability of the polyesters of Examples 3 and 4. The results of this test are given in the following table, which illustrates the surprisingly increased resistance to thermal and hydrolytic breakdown of the polyesters of 3,3'-oxybis (2,2-dimethylpropionic acid) of this invention. Hydrolytic stability was determined by maintaining the sample of 110° C. in an atmosphere of 100% relative humidity for seven days and measuring the percent breakdown. The samples were treated in the humid atmosphere and in vacuum for the times and at the temperatures indicated.

As can be seen from the table, the polyester prepared from 3,3'-oxybis(2,2-dimethylpropionic acid) did not breakdown or cross-link after treatment at 275° C. for three hours in the atmosphere or at 290° C. for two hours in vacuum.

EXAMPLE 6

*Incorporation of polyester of 3.3'-oxybis (2,2-dimethylproprionic acid) in vinyl resin*

100 parts by weight of Vinylite copolymer of vinyl chloride and vinyl acetate were mixed with 45 parts of a polyester of 3,3'-oxybis(2,2-dimthylpropionic acid) and 1,4-cyclohexanedimethanol (60% trans isomer) prepared in accordance with the procedure of Example 3 in a dry blender for one hour. The mixture was then transferred to a Banbury mixer and fused in about 10 minutes at approximately 300° F. The mass was then transferred to a warm-up mill the roll temperature of which was maintained at 290° F. The compound was then fed as needed to a 4-roll inverted "L" calendar. The temperature of the rolls ranged from 270° F. to 310° F. The resin composition was thus converted to a translucent, flexible film of about 0.004 inch in thickness.

EXAMPLE 7

*Resin compositions placticized with polyester of 3,3'-oxybis (2,2-dimethylpropionic acid) and 1,4-cyclohexanedimethanol*

A polyester derived from 3,3'-oxybis(2,2-dimethylpropionic acid) and 1,4-cyclohexanedimethanol (60–65% trans isomer) prepared as in Example 3 was milled in an amount of about 35 parts by weight on heated rolls with 100 parts by weight of cellulose acetate-butyrate and the composition so produced was granulated and molded in a standard injection press so as to give molded pieces which were quite clear and from which the plasticizer showed no tendency to exude. The resistance to extraction by water and to loss on heating were excellent. This plasticizer was also compatible with other derivatives of cellulose such as the acetatepropionate, etc.

Thirty parts by weight of this plasticizer were dis-

| Polyester Base or Designation | Original Intrinsic Viscosity | Intrinsic Viscosity After 7 Days at 110° and 100% Rel. Hum. | Percent Breakdown | Thermal Breakdown Time (Atm.) | Thermal Breakdown Time (Vacuum) |
|---|---|---|---|---|---|
| 3,3'-Oxybis (2,2-Dimethyl-propionic Acid). | 0.46 | 0.37 | 20 | No breakdown or cross-linking after 3 hrs. at 275° C. | No breakdown or cross-linking after 2 hrs. at 290° C. |
| 3,3'-Oxybispropionic Acid | 0.27 | 0.10 | 63 | Breakdown and cross-linking after 1 hr. at 240° C. | Breakdown and cross-linking after 5 min. at 260° C. | solved in a dope of 100 parts of cellulose triacetate dissolved in 540 parts by weight of methylene chloride and 60 parts by weight of methanol, and films were cast from this dope which were clear and flexible. Similarly, plasticized films were made from cellulose acetate containing various proportions of acetyl groups Other clear, nonexudent films plasticized with the polyester of Example 3 were made from polyvinyl chloride. This polyester plasticizer of the type described by Example 3 can also be advantageously employed as a component of paints, varnishes and water-based coating compositions.

We have found that from about 20 to about 80 parts by weight of the polymeric plasticizer of this invention per 100 parts by weight of the resin to which added are most effective as a plasticizer.

Although the invention has been described in considerable detail with reference to certain preferred embodiments thereof, it will be understood that variations and modifications can be effected without departing from the spirit and scope of the invention as described hereinabove and as defined in the appended calims.

We claim:

1. A plasticized resin composition comprising (a) a member selected from the groups consisting of a polyvinyl resin, copolymers of polyvinyl resins or a cellulose derivative resin and (b) a plasticizing amount of a linear polyester of 3,3'-oxybis(2,2-dimethylpropionic acid) and 1,4-cyclohexanedimethanol having an intrinsic viscosity of from about 0.35 to about 0.55.

2. A plasticized resin composition comprising (a) a member selected from the groups consisting of a poly vinyl resin, copolymers of polyvinyl resins or a cellulose derivative resin and (b) from about 20 to about 80 parts by weight per 100 parts by weight of said resin of a linear polyester of 3,3'-oxybis(2,2-dimethylpropionic acid) and 1,4-cyclohexanedimethanol having an intrinsic viscosity of from about 0.35 to about 0.55.

3. A resin composition as defined by claim 2 wherein the resin is a polymer of vinyl chloride.

4. A resin composition as defined by claim 2 wherein the resin is a copolymer of vinyl chloride and vinyl acetate.

5. A resin composition as defined by claim 2 wherein the resin is cellulose acetate.

6. A resin composition as defined by claim 2 wherein the resin is cellulose acetate-butyrate.

7. A resin composition as defined by claim 2 wherein the resin is cellulose triacetate.

References Cited by the Examiner
UNITED STATES PATENTS

| 2,466,419 | 4/1949 | Hagemeyer | 260—535 |
| 2,645,659 | 7/1953 | Morris et al. | 106—181 |
| 2,901,466 | 8/1959 | Kibler et al. | 260—75 |
| 3,049,506 | 8/1962 | Kibler et al. | 260—75 |

ALEXANDER H. BRODMERKEL, *Primary Examiner.*

D. J. ARNOLD, *Assistant Examiner.*